United States Patent Office 2,744,901
Patented May 8, 1956

2,744,901

BIS-TETRAHYDRO-1-ISOQUINOLYL QUATERNARY AMMONIUM SALTS

Fred P. Nabenhauer, Philadelphia, Pa., assignor to Smith, Kline & French Laboratories, Philadelphia, Pa., a corporation of Pennsylvania No Drawing. Application July 30, 1951,
Serial No. 239,387

6 Claims. (Cl. 260—286)

This invention relates to certain new chemical compounds which possess physiological activity, and, more particularly, to certain novel bis-quaternary tetrahydroisoquinolinium salts which are useful as intermediates in the preparation of pharmaceutical compounds and, in addition, themselves possess physiological properties, especially muscle relaxant activity similar to that of curare.

Generally speaking, the bis-quaternary tetrahydroisoquinolinium salts according to this invention are represented by the following general formula:

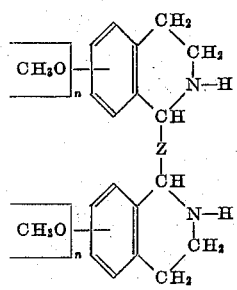

in which:

Y is selected from the group consisting of hydrogen, hydroxy and methoxy radicals.

$n$ is an integer of from 1 to 3.

Z is an alkylene or aromatic bridge.

R is a lower alkyl radical.

A⁻ is an anion from a lower-alkyl derivative of a strong mineral acid.

More particularly, the compounds according to this invention possess the structure:

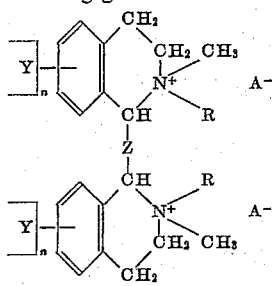

in which:

Y is selected from the group consisting of hydroxy and methoxy radicals.

$n$ is an integer of from 1 to 3.

Z is selected from the group consisting of an alkylene radical of from 4 to 12 carbon atoms and phenylene and p-xylylene radicals.

R is selected from the group consisting of methyl and ethyl.

A⁻ is an acid anion selected from the group consisting of chloride, bromide, iodide, methosulfate and ethosulfate radicals.

The compounds of this invention will be prepared from appropriate methoxy-substituted bis-1,2,3,4-tetrahydroisoquinolyl compounds corresponding to the general formula:

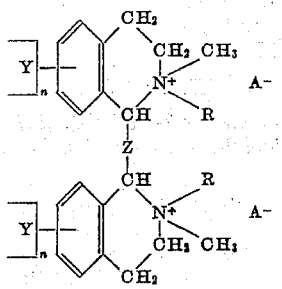

where $n$ is an integer from 1 to 3 and Z is an alkylene radical of from 4 to 12 carbon atoms or phenylene and p-xylylene radicals. These compounds are all either known to the art or, their structures having been made obvious, will be readily prepared by the method of Hahn and Gudjons: Berichte 71B, 2183 (1938). Generally speaking, this preparation comprises reacting an appropriately-substituted phenylethylamine with an α,ω-dicarboxy-alkane corresponding in length to that of the alkane chain desired, or the acyl halides or esters thereof such as diethyl malonate, sebacoyl chloride and suberic acid, or a dicarboxylic aromatic, such as terephthalic acid, or its acyl halides, where an aromatic bridge is desired. The bis-phenylethylamide derivative so formed will then be condensed to effect ring closure, using, for example, phosphorous pentoxide or phosphorous oxychloride to form the corresponding bis-dihydroisoquinolyl-alkane. The dihydro derivative so prepared will be reduced to the corresponding bis-tetrahydroisoquinolylalkane using standard techniques well known to the art, such as, hydrogenation under pressure in the presence of a noble metal catalyst, such as platinum or palladium or carbon.

Generally speaking, the appropriate methoxy-substituted bis-tetrahydroisoquinolyl compound is warmed in aqueous solution of formaldehyde and formic acid to prepare the n-methyl derivative. Quarternization of the tetrahydroisoquinolyl nitrogens is effected by alkylation, using any well-known alkylating agent, such as the lower-alkyl derivative of a strong mineral acid, as e. g., methyl iodide, dimethylsulfate, methyl bromide, ethyl iodide and the like, to form the quaternary-bis-tetrahydroisoquinolinium salt. The method for the preparation of these compounds will become apparent by the following general reaction:

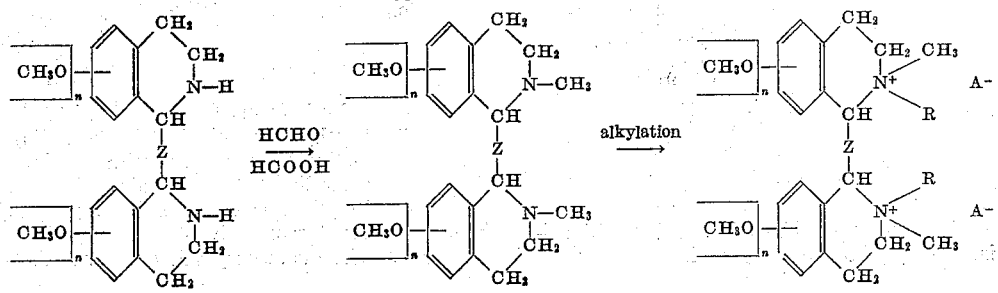

in which:

$n$ is an integer of from 1 to 3.

Z is selected from the group consisting of an alkylene radical of from 4 to 12 carbon atoms and phenylene and p-xylylene radicals.

R is selected from the group consisting of methyl and ethyl.

$A^-$ is an acid anion selected from the group consisting of chloride, bromide, iodide, methosulfate and ethosulfate radicals.

The hydroxy-substituted bis-tetrahydroisoquinolinium salts of this invention are prepared from the corresponding methoxy-substituted compounds, prepared as above, by simply demethylating them, using standard techniques well-known in the art, such as treatment with hydriodic acid preserved with small amounts of hypophosphorous acid.

It will be apparent from a consideration of the above reaction that the compounds of this invention are capable of occurring in optical isomeric forms, there being present in the molecule two equivalent asymmetric carbon atoms which give rise to two centers of optical isomerism in the molecule. There are, therefore, three distinct optical isomeric forms in which each compound is capable of existing, the dextro-rotatory, the levo-rotatory and the meso forms. It will further be observed that the optical form of the final product will depend upon that of the starting material. In other words, if as a starting material the levo-rotatory form is utilized, the compound of this invention will correspond to that optical isomer. Conversely, if one uses as a starting material a mixture of the dextro and levo forms, such as the racemic mixture, the end product again will be prepared as the corresponding racemic mixture.

This invention embraces all of the isomeric forms arising from optically active centers of these compounds. It is intended that the designation of the compounds of this invention, by names and formulae throughout the specification and claims, shall be read to include all isomeric forms and mixtures thereof unless otherwise specified.

Throughout this disclosure the racemic mixture and the meso forms are referred to as isomeric forms, and are readily distinguishable and separable by virtue of variations in melting points, solubility, and other physical properties. Throughout the examples the terminology A represents the less soluble isomeric form and B the more soluble isomeric form obtained in the separation of the secondary amine starting materials. In the case of the compounds having an even number of carbons in the alkylene radical, or, in lieu of the alkylene radical, an aromatic bridge, this solubility is in terms of water as the solvent. Where the alkylene radical has an odd number of carbons, this solubility is in terms of methyl alcohol as the solvent.

As more particularly illustrative of the compounds of this invention will be the following specific examples:

EXAMPLE 1

α,ω-Bis-(6,7-dimethoxy-2-methyl-1,2,3,4-tetrahydroisoquinolyl-1)-butane dimethiodide

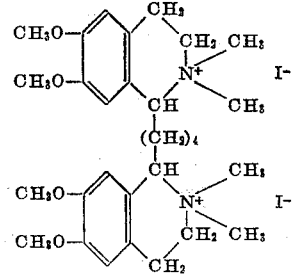

Five grams of bis-(6,7-dimethoxy-1,2,3,4-tetrahydroisoquinolyl)-butane dihydrochloride, (the mixture of forms A and B directly from reduction of the dihydro compound), were suspended in 100 cc. of water which was made strongly alkaline by the addition of 5 cc. of 40% sodium hydroxide. The base was then redissolved by the addition of 15 cc. of 85% formic acid. Ten cc. of 37% formaldehyde was added whereupon the mixture was heated to boiling and refluxed gently for 30 minutes until the evolution of carbon dioxide had ceased.

The N-methyl derivative was precipitated from the reaction mixture by addition of an excess of 40% sodium hydroxide solution and extracted with benzene while quite warm, followed by drying with anhydrous sodium sulfate and filtered. The benzene solvent was driven off by distillation on a steam bath and the residual base was dissolved in 50 cc. of denatured alcohol. Upon the addition of 5 cc. of methyl iodide and allowing the solution to stand for some time, the quaternary isoquinolinium iodide was crystallized from the solution. When crystallization had been completed the product was filtered off and purified by dissolving in hot water and treating the resulting solution with activated carbon. Filtration to remove the carbon provided a clear solution from which crystals of α-ω-bis-(6,7-dimethoxy-2-methyl-1,2,3,4-tetrahydroisoquinolyl)-butane dimethiodides upon filtration, washing with water, and drying, had a melting point of 268–269° C.

EXAMPLE 2

α,ω-Bis-(6,7-dimethoxy-2-methyl-1,2,3,4-tetrahydroquinolyl-1)-hexane dimethiodide

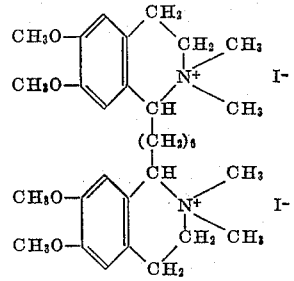

Both forms (A and B) of bis-(6,7-dimethoxy-1,2,3,4-tetrahydroisoquinolyl)-hexane dihydrochloride were N-methylated separately with formic acid and formaldehyde according to the procedure of Example 1. The tertiary isoquinoline compounds so prepared were then quaternized separately using methyl iodide as in Example 1. The quaternary salt, form isomer A, after purification by recrystallization melted at 241–242° C. The quaternary salt of isomer B upon purification had a melting point of 230–232° C.

EXAMPLE 3

α-ω-Bis-(6,7-dimethoxy-2-methyl-1,2,3,4-tetrahydroisoquinolyl-1)-heptane dimethiodide

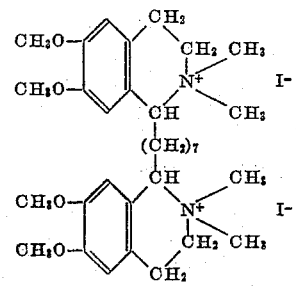

Both forms (A and B) of bis-(6,7-dimethoxy-1,2,3,4-tetrahydroisoquinolyl)-heptane dihydrochloride were N-methylated separately with formic acid and formaldehyde according to the procedure of Example 1. The tertiary isoquinoline compounds so prepared were then quaternized separately using methyl iodide as in Example 1. The quaternary salt of isomer A on purification by recrystallization melted at 174–175° C. The quaternary salt of isomer B upon purification had a melting point of 177–178° C.

EXAMPLE 4

α,ω - Bis - (6,7 - dimethoxy - 2 - methyl - 1,2,3,4 - tetra - hydroisoquinolyl-1)-octane dimethiodide

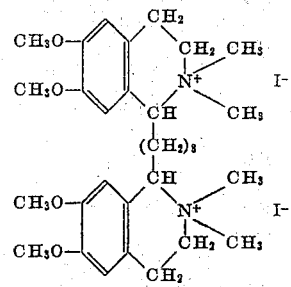

Both forms (A and B) of bis-(6,7-dimethoxy-1,2,3,4-tetrahydroisoquinolyl) - octane dihydrochloride were N-methylated separately with formic acid and formaldehyde according to the procedure of Example 1. The tertiary isoquinoline compounds so prepared were then quaternized using methyl iodide as in Example 1. The quaternary salt of isomer A on purification by recrystallization melted at 237°–239° C. The quaternary salt of isomer B upon purification had a melting point of 241°–242° C.

EXAMPLE 5

α,ω - Bis - (6,7 - dimethoxy - 2 - methyl - 1,2,3,4 - tetra - hydroisoquinolyl-1)-nonane dimethiodide

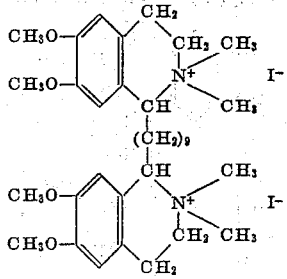

A mixture of both forms (A and B) of bis-(6,7-dimethoxy-1,2,3,4-tetrahydroisoquinolyl)-nonane dihydrochloride was N-methylated with formic acid and formaldehyde according to the procedure of Example 1. The tertiary isoquinoline compound so prepared was then quaternized using methyl iodide as in Example 1. The salt crystallized and separated from the solution by filtration. Purification by recrystallization from hot water and treatment with activated carbon provided crystals melting at 300°–302° C.

EXAMPLE 6

α,ω - Bis - (6,7-dimethoxy - 2 - methyl - 1,2,3,4 - tetra - hydroisoquinolyl-1)-pentane dimethiodide

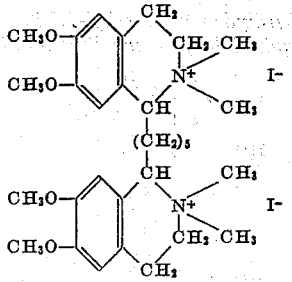

A mixture of both forms (A and B) of bis-(6,7-dimethoxy-1,2,3,4-tetrahydroisoquinolyl)-pentane dihydrochloride was N-methylated with formic acid and formaldehyde according to the procedure of Example 1. The tertiary isoquinoline compound so prepared was then quaternized using methyl iodide as in Example 1. The product crystallized from the solution and was filtered off; and was purified by recrystallization from water.

EXAMPLE 7

α,ω - Bis - (6,7-dimethoxy - 2 - methyl - 1,2,3,4 - tetra - hydroisoquinolyl-1)-octant diethiodide

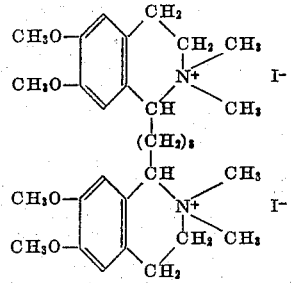

A mixture of both forms (A and B) of bis-(6,7-dimethoxy - 2 - methyl - 1,2,3,4 - tetrahydroisoquinolyl) - octane dihydrochloride, prepared as an intermediate in Example 4 above, was quaternized using ethyl iodide in a procedure identical with that of Example 1 above. The product crystallized from the solution and was filtered off; it was purified by recrystallization from water.

EXAMPLE 8

α,ω - Bis - (6,7-dimethoxy - 2 - methyl - 1,2,3,4 - tetra - hydroisoquinolyl-1)-methane dimethiodide

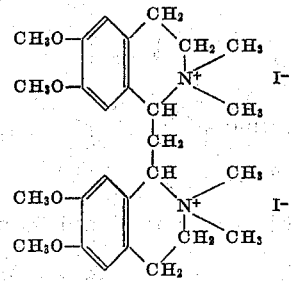

A mixture of forms A and B of bis-(6,7-dimethoxy-1,2,3,4-tetrahydroisoquinolyl)-methane dihydrochloride was N-methylated with formic acid and formaldehyde according to the procedure of Example 1. The tertiary isoquinoline compound so prepared was then quaternized using methyl iodide. The product was purified by recrystallization from water.

EXAMPLE 9

α,ω - Bis - (6,7-dimethoxy - 2 - methyl - 1,2,3,4 - tetra - hydroisoquinolyl-1)-octane dimethosulfate

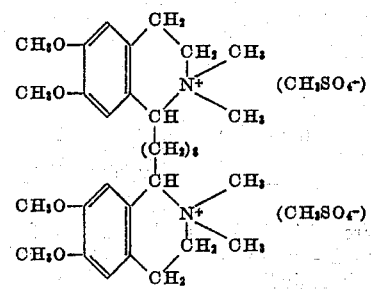

A mixture of both forms (A and B) of bis-(6,7-dimethoxy-1,2,3,4-tetrahydroisoquinolyl)-octane dihydrochloride was N-methylated with formic acid and formaldehyde according to the procedure of Example 1. The tertiary isoquinoline compound so prepared was then quaternized using dimethyl sulfate following the procedure described for methyl iodide in Example 1. The product was purified by recrystallization from water.

EXAMPLE 10

α,ω-Bis-(6,7,8-trimethoxy-2-methyl-1,2,3,4-tetrahydro-isoquinolyl-1)-octane dimethiodide

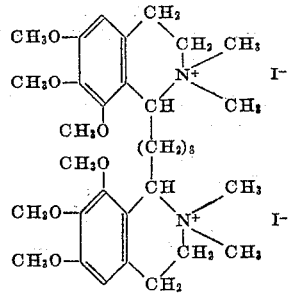

A mixture of both forms (A and B) of bis-(6,7,8-tri methoxy - 1,2,3,4 - tetrahydroisoquinolyl)-octane dihydrochloride was N-methylated with formic acid and formaldehyde according to the procedure of Example 1. The tertiary isoquinoline compound so prepared was then quaternized using methyl iodide as in Example 1. The product was purified by recrystallization from water.

EXAMPLE 11

α,ω-Bis-(6,7-dimethoxy-2-methyl-1,2,3,4-tetrahydro-isoquinolyl-1)-benzene dimethiodide

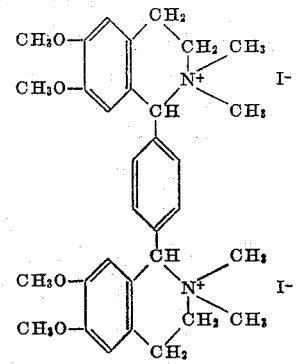

A mixture of both forms (A and B) of 1,4-bis-(6,7-dimethoxy - 1,2,3,4 - tetrahydroisoquinolyl) - benezene dihydrochloride was N-methylated with formic acid and formaldehyde according to the procedure of Example 1. The tertiary isoquinoline compound so prepared was then quaternized using methyl iodide as in Example 1. The product was crystallized from the solution and filtered off; followed by purification by recrystallization from water.

EXAMPLE 12

α,ω-Bis-(6,7-dihydroxy-2-methyl-1,2,3,4-tetrahydroiso-quinolyl-1)-butane dimethiodide

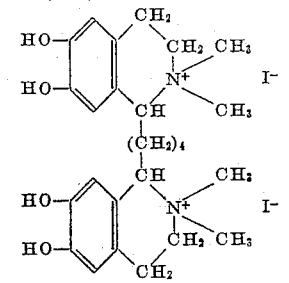

A mixture of both forms (A and B) of α,ω-bis-(6,7-dimethoxy - 2 - methyl - 1,2,3,4 - tetrahydroisoquinolyl-1)-butane dimethiodide prepared in Example 1 above was refluxed for one-half hour with concentrated hydriodic acid preserved with hypophosphorous acid. After the evolution of methyl iodide had ceased, the reaction mixture was cooled and the product crystallized out of solution. Dilution of the resulting mixture with isopropyl alcohol, followed by filtration of the crystals and washing with small quantities of isopropyl alcohol, yielded crystalline α,ω-bis-(6,7-dihydroxy-2-methyl-1,2,3,4-tetrahydro- isoquinolyl-1)-butane dimethiodide which was then air dried.

EXAMPLE 13

α,ω-Bis-(6,7-dihydroxy-2-methyl-1,2,3,4-tetrahydroiso-quinolyl-1)-hexane dimethiodide

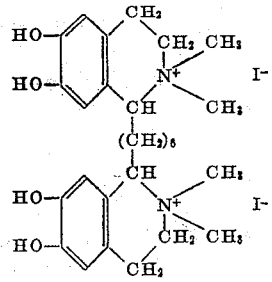

The isomer B of α,ω-bis-(6,7-dimethoxy-2-methyl-1,2,3,4 - tetrahydroisoquinolyl - 1) - hexane dimethiodide, melting point of 241–242° C. prepared in Example 2 above was refluxed for one-half hour with excess concentrated hydriodic acid preserved with hypophosphorous acid. After the evolution of methyl iodide had ceased, the reaction mixture was cooled and the product crystallized out of solution. Dilution of the resulting mixture with isopropyl alcohol, followed by filtration of the crystals and washing with small quantities of isopropyl alcohol, yielded crystals of α,ω-bis-(6,7-dihydroxy-2-methyl-1,2,3,4 - tetrahydroisoquinolyl - 1) - hexane dimethiodide, which was then air dried.

EXAMPLE 14

α,ω-Bis-(6,7-dihydroxy-2-methyl-1,2,3,4-tetrahydroiso-quinolyl-1)-octane dimethiodide

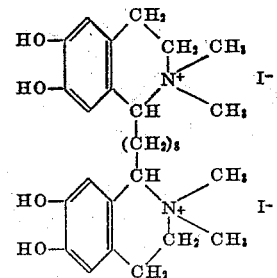

One gram of the isomer A of α,ω-bis-(6,7-dimethoxy-2 - methyl - 1,2,3,4 - tetrahydroisoquinolyl - 1) - octane dimethiodide, melting point 237–349° C., prepared in Example 4 above, was refluxed for one-half hour with 5 cc. of concentrated hydriodic acid preserved with hypophosphorous acid. Methyl iodide was evolved and when this had ceased the refluxed mixture was cooled. The α,ω - bis - (6,7 - dihydroxy - 2 - methyl - 1,2,3,4 - tetrahydroisoquinolyl-1)-octane dimethiodide was crystallized out of solution. Dilution of the mixture with 10 cc. of isopropyl alcohol followed by filtration and washing of the crystals with isopropyl alcohol yielded a product which upon air drying melted at 250–252° C.

EXAMPLE 15

α,ω-Bis-(6,7-trihydroxy-2-methyl-1,2,3,4-tetrahydroiso-quinolyl-1)-octane dimethiodide

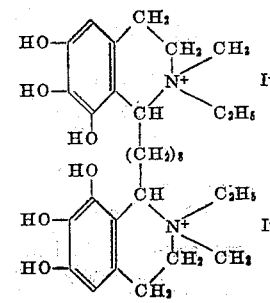

A mixture of both forms (A and B) of α,ω-bis-(6,7,8-trimethoxy-2-methyl-1,2,3,4-tetrahydroisoquinolyl)-octane dimethiodide prepared in Example 10 above was refluxed for one-half hour with concentrated hydriodic acid preserved with hypophosphorous acid. When the evolution of methyl iodide ceased, the reaction mixture was cooled and the product α,ω-bis-(6,7,8-trihydroxy-2-methyl-1,2,3,4-tetrahydroisoquinolyl)-octane dimethiodide was crystallized from solution. Dilution of the mixture with isopropyl alcohol followed by filtration off of the crystals and washing with small quantities of isopropyl alcohol provided a crystalline product upon air drying.

When optically active isomers are desired the dextro and levo components of the secondary amine starting material may be obtained from the resolution of the racemic mixture by use of an optically active acid, such as, dextro or levo tartaric acid by methods common to the art, described, as for example, in Karrer's Organic Chemistry on page 101.

EXAMPLE 16

α,ω-Bis-(6-methoxy-2-methyl-1,2,3,4-tetrahydroisoquinolyl-1)-hexane diethobromide

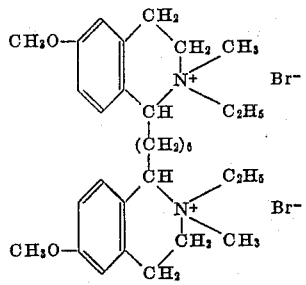

A mixture of both forms (A and B) of bis-(6-methoxy-1,2,3,4-tetrahydroisoquinolyl)-hexane dihydrochloride was N-methylated with formic acid and formaldehyde according to the procedure of Example 1. The isoquinoline compound so prepared was quaternized using ethyl bromide in a procedure identical with that of Example 1 above. The product crystallized from the solution and was filtered off. It was purified by recrystallization from water.

EXAMPLE 17

α,α'-Bis-(6,7-dimethoxy-2-methyl-1,2,3,4-tetrahydroisoquinolyl-1)-p-xylene dimethiodide

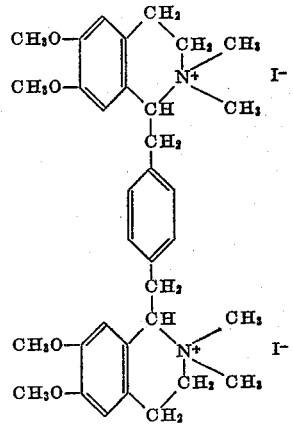

A four and one-half gram mixture of both forms (A and B) of α,α'-bis-(6,7-dimethoxy-1,2,3,4-tetrahydroisoquinolyl-1)-p-xylene dihydrochloride was N-methylated with formic acid and formaldehyde according to the procedure of Example 1. The tertiary isoquinoline compound so prepared was then quaternized using methyl iodide as in Example 1. On standing, all isomers of the desired products crystallized from solution and were collected by filtering. The product, purified by recrystallization from water, melted at 250–253° C.

It will be appreciated that the above examples are merely illustrative and that it is not desired to be limited except as set forth in the claims.

Bis-hydroxytetrahydroisoquinolyl-alkanes are claimed in Serial No. 235,394, filed July 5, 1951.

What is claimed is:

1. A compound having the following formula:

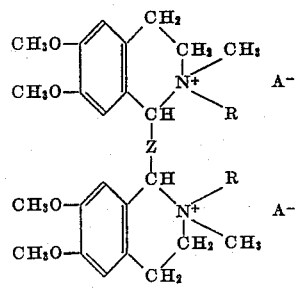

in which Z is selected from the group consisting of an alkylene radical having from 7 to 12 carbon atoms and phenylene and p-xylene radicals, R is selected from the group consisting of methyl and ethyl, and A$^-$ is an acid anion selected from the group consisting of chloride, bromide, iodide, methosulfate and ethosulfate radicals.

2. A compound having the following formula:

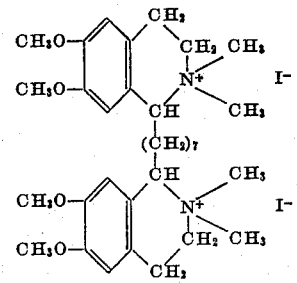

3. A compound having the following formula:

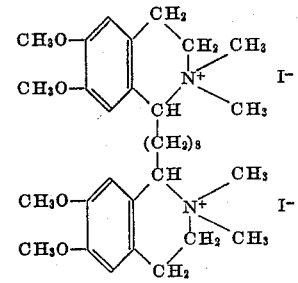

4. A compound having the following formula:

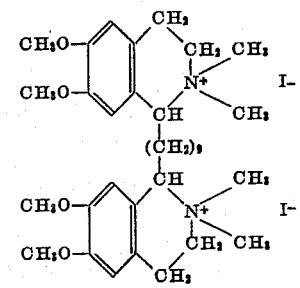

5. A compound having the following formula:
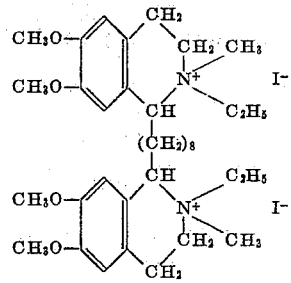
6. A compound having the following formula:
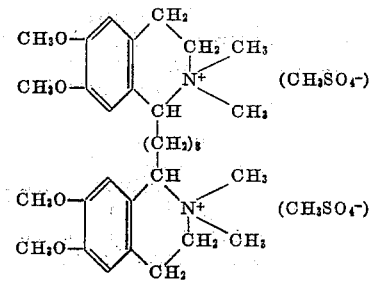
References Cited in the file of this patent
Pailer et al.: Monatshefte, vol. 79, pp. 135–141 (1948).